Jan. 27, 1970

J. D. ELAM 3,491,882

METHOD AND APPARATUS FOR BREAKING EMULSIONS

Filed May 8, 1968

INVENTOR.
JAMES D. ELAM
BY
ATTORNEY

United States Patent Office 3,491,882
Patented Jan. 27, 1970

3,491,882
METHOD AND APPARATUS FOR BREAKING
EMULSIONS
James D. Elam, 385 Cloud Drive,
Baton Rouge, La. 70806
Filed May 8, 1968, Ser. No. 727,483
Int. Cl. B01d 17/04
U.S. Cl. 210—73       10 Claims

ABSTRACT OF THE DISCLOSURE

A method and apparatus for breaking emulsions comprising a vessel having an inlet and an outlet, the vessel having arranged therein, in sequence, a graded gravel bed, a layer of knit plastic monofilament, a mesh wire, layered between said knit monofilament and a metal floor grating, a second mesh wire on the opposite side of said grating, a compressed wire wool, a third layer of mesh wire and a second metal floor grating. Provision is made for feeding into the coalescer a chemical or mechanical emulsion so as to first contact the graded gravel bed. Suitable level controls and outlet valves are provided. If emulsion contains more than two components, the coalescers of the invention may be stacked.

BACKGROUND OF THE INVENTION

Field of the invention

The present invention relates to a method and apparatus for breaking liquid-liquid emulsions having at least two components.

Description of the prior art

Coalescing devices have been known for some time, but have all tended to be of poor efficiency in breaking tight emulsions. In certain chemical processes, these so called "tight" emulsions have presented serious problems in recovery of expensive raw materials which could otherwise be recycled, if recovered.

Common deficiencies experienced by multi-component coalescers includes a tendency to channel, failure to coalesce small droplets, and especially, a tendency toward fouling of coalescing material, causing expensive down-time. Generally, most coalescers follow a filter approach.

The method and appartus for breaking emulsions, hereinafter decribed, overcomes these and attendant problems when working with oil in water emulsions, bu'ylenes, mixed olefins, isobutenes, depropanizers, and other chemical and mechanical emulsions.

SUMMARY OF THE INVENTION

An apparatus for breaking emulsions comprising a closed vessel having an inlet and an outlet, the vessel having arranged therein, in sequence, a graded gravel bed, the smallest gravel being at the outer most surface, a layer of knit plastic monofilament, a layer of mesh wire screen, a metal floor grating, a second mesh wire screen, a compressed wire wool, a third layer of mesh wire screen, and a second metal floor grating, the first and second metal floor gratings being secured together by suitable means so as to compress said wire wool therebetween; there being additionally provided a backwash means and product collection means.

The invention further relates to the feeding of chemical and/or mechanical emulsions through the inlet of the above apparatus, passing the emulsion through the graded gravel bed, thence through the sequence of knit plastic monolament, mesh wire screens past the metal floor grating and through the compressed wire wool and screen, through the remaining metal floor grating, the light fraction being collected on top of the heavier portion of the mixture being separated, the two fractions being collected by suitable means therefor.

DESCRIPTION OF THE PREFERRED EMBODIMENTS

Figure 1:
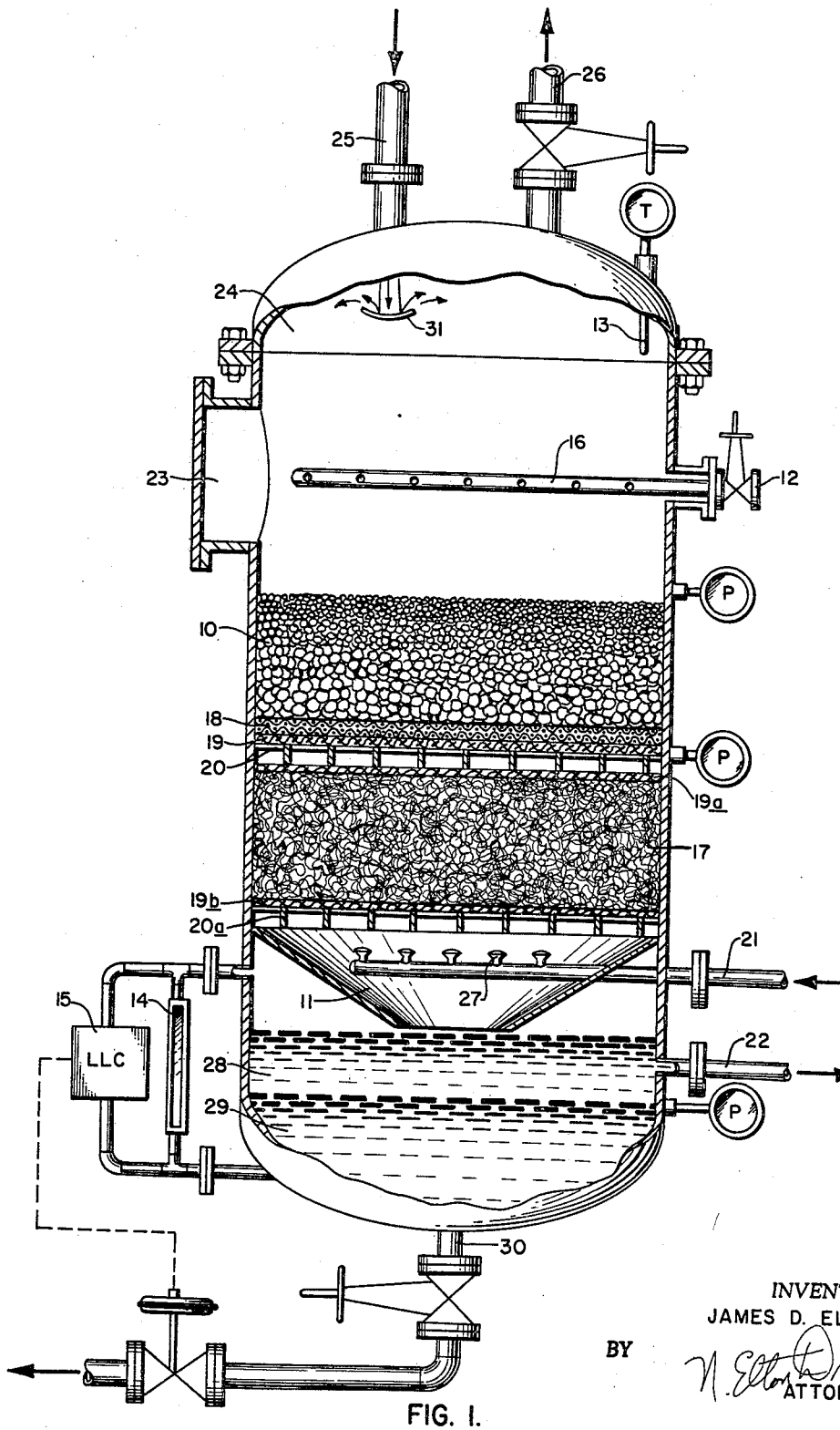
Figure 2:
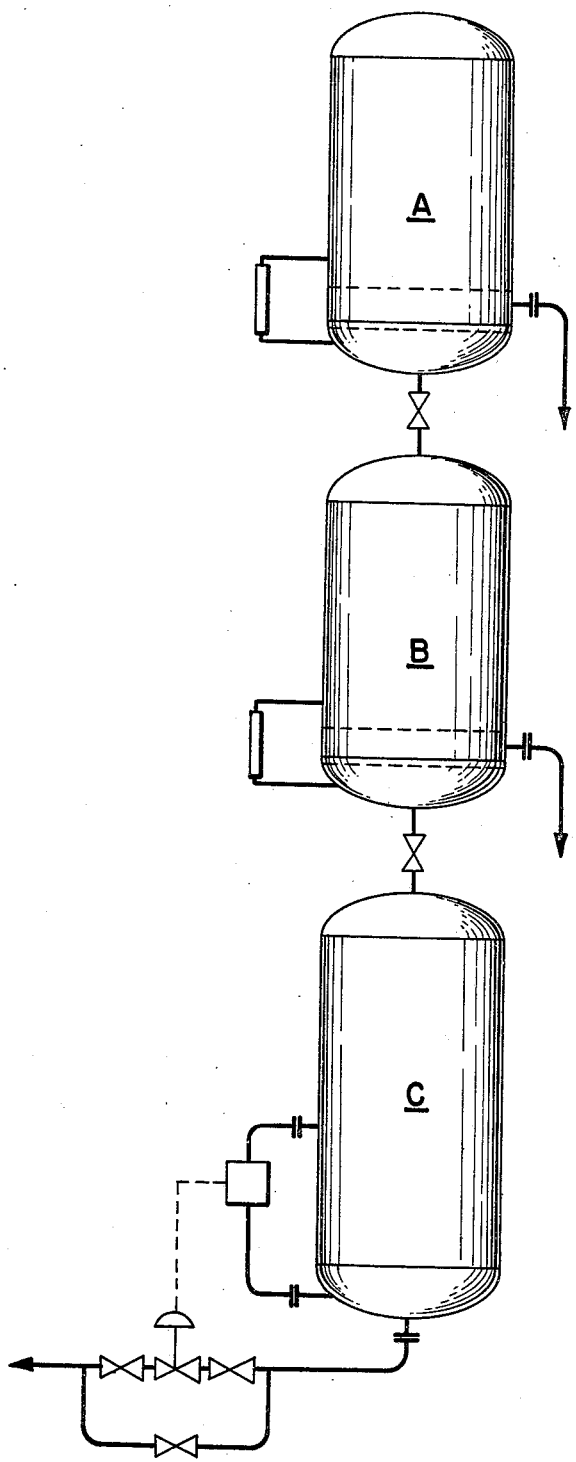

The invention will be more readily understood from a reading of the following specification and by reference to the accompanying drawings wherein an example of the invention is shown, and wherein:

FIGURE 1 is a sectional, diagrammatic elevational view of the emulsion breaking apparatus of the present invention; and FIGURE 2 is a schematic representation of an application of the apparatus of FIGURE 1, wherein several are placed together for breaking emulsions having more than two components.

In the drawings illustrating the invention, like numerals refer to like parts throughout. Referring specifically to the drawings, in FIG. 1 there is illustrated the coalescing assembly of the invention wherein a graded gravel bed 10 is employed as the first filtering material through which the emulsion must pass. Preferably, the gravel sizes in the bed 10 vary from pea gravel, having a diameter of about one-eighth inch up to gravel having a diameter of about one inch, or more. Convenience is the main limiting factor on the larger size gravel.

Throughout the graded bed 10, the individual layers consist of gravel which is most preferably sized in gradually increasing increments, the largest size being at the gravel strata fartherest removed from the inlet feed line 25. Size, or dimension, of each layer is determined by the size of the individual coalescer in use. Alternatively, ceramic particles graded by size may be used with equal satisfaction.

Immediately juxtaposed to the largest of the graded gravel of the bed 10, is a layer of knit plastic monofilament 18. The knit monofilament layer 18 is arranged in sealing, close relation to the sides of the vessel containing the coalescing layers. Most preferred of the plastic monofilament suitable in practicing the invention is polypropylene. The layer of knit polypropylene 18 is preferably of a thickness equal to from about one-twentieth to one-sixth the thickness of gravel bed 10. Best results are obtained when the knit polypropylene layer 18 is about one-twelfth of the thickness of the gravel bed 10.

The knit plastic monofilament may be selected from polypropylene, Saran, Teflon, Dacron, and the like. These are all available commercially. The knit monofilament is preferably knitted from monofilament ranging in diameter from 0.001 to about 0.012 inch. Most acceptable, however, are monofilament having a width of about 0.013 inch and a thickness of about 0.009 inch. These monofilaments may be knitted in an arrangement having unaligned asymmetrical openings, for best results in the invention. Preferred is an arrangement having about 10–6 courses per inch in the finished, knitted product. Most important, however, is the fact that the knit plastic monofilament is oil wettable but not water wettable.

Next in the sequence of coalescing layers is a wire mesh screen 19 resting upon the upper surface of metal grating 20, with an additional layer of wire mesh screen 19a laying immediately next to the bottom of the metal grating 20. For optimum results the screen is preferably 4 x 4 mesh x 0.050 inch diameter wire. The screen 19a beneath the grating 20 is made from 0.080 diameter wire, if good results are to be obtained. Other diameter and mesh wire screens are useful if the dimensions thereof do not vary from those, above, by more than about 25 percent.

The wire mesh 19 and 19a is generally available in knitted form having widths of from ¼ to about 30 inches. The knit polypropylene 18 is of the same general dimensions, relative to knit monofilament, as the wire mesh 19 and 19a.

The wire employed in the screen may be of stainless steel, Inconel, Hastelloy, tungsten, aluminum, copper, silver or galvanized. However, most preferred are the wire screen made from stainless steel, even though particular applications may require any of the others, above.

The metal grating 20 may be of any readily available welded steel or other metal grating materials. However, carbon steel is generally preferred, even though some applications may require the grating 20 to be made from stainless steel or Monel metal. The most suitable size grating is known as PW–1, standard mesh. Other mesh sizes may be suitable for particular, special applications of the present invention.

The sequence of coalescing layers contains next a substantial, compressed layer of wire wool 17. The wool layer 17 is followed, in order, by a wire mesh screen 19b and a second metal grating 20a. Preferably, the metal gratings 20 and 20a are secured together (not shown) by means which maintains the wool 17 in a compressed state.

It has been found that the compression of wool 17 is important in achieving a proper breaking of mechanical and chemical emulsions.

The wire wool 17, so called, is preferably of either a metal or plastic material which is capable of being formed into an entangled mass. The individual strands may be made from a ferrous or non-ferrous metal, or a plastic, such as the materials employed in the knitted plastic monofilament 18 above. Cellulose materials have been found satisfactory when substituted for the wool material 17.

For proper utilization of the coalescer of the invention, the drawing of FIG. 1 illustrates the vessel 31 having an inlet emulsion feed line 25 exciting into the upper portion of vessel 31 past a baffle plate 31.

The baffle plate 31 is not absolutely necessary, but aids in avoiding channeling through the graded gravel bed 10. A temperature sensing device 13 is optionally provided, to extend through vessel 31 into the area above gravel bed 10 containing the emulsion 24. It may be connected to an automatic control means (not shown).

It is important for the coalescer to contain sample tube 16 extending through sample valve 12 which is located in the emulsion 24. In the same general area, provision is made for either removing the upper portion of the vessel 31 or an entrance way through opening 23.

Beneath metal grating 20a there is advantageously provided means 21 for backwashing through the coalescing bed, backwash fluid exiting through backwash outlet valve 26. Usually, nozzles 27 or other spraying means are provided on the backwash means 21. A cone baffle 11 is preferably used in conjunction with collection of the separated phases of the emulsion and is generally located beneath the bottommost metal grating 20a, for best results. Optionally, the cone baffle 11 may extend downwardly into liquid phase 29.

To control liquid level and proper balance of product 28 and 29 accumulation within the bottom of vessel 31, the light fraction may be removed therefrom through take-off line 22.

The fraction 29, taken off through exit line 30 may be further separated by stacking more than one coalescer, as illustrated in FIG. 2, and feeding fraction 29 from coalescer A to coalescer unit B. The unit in FIG. 2, designated C, would ultimately contain the heaviest fraction separated, usually water. Levels of fractions 28 and 29 are regulated and monitored by the liquid level control 15 and sight glass 14 (density type), respectively.

The coalescers of the present invention are adaptable for application requiring sizes ranging from about 4 inches to 30 feet in diameter. Actual size is determined by the desired flow rate for each particular application. Flow rate is about 1.5 feet per minute per square foot of surface area. Calculations to determine required size of coalescer is well known to the art.

As is apparent from the foregoing specification, the present invention is susceptible of being embodied with various alterations and modifications which may differ particularly from those that have been described in the preceding specifications and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:

1. An apparatus for breaking chemical and mechanical liquid-liquid emulsions which comprises a vessel having an inlet and an outlet, said vessel having arranged therein, in sequence, a graded gravel bed, the smallest gravel being at the outer most surface, a layer of knit plastic monofilament, a layer of mesh wire screen, a metal floor grating, a second mesh wire screen, a wire wool layer compressed between the first metal grating and a second metal grating, said second grating having a layer of wire mesh screen interposed between the grating and the wire wool, said first and second gratings being fixedly secured together to provide compression of said wire wool layer, there being additionally provided product collection means.

2. The apparatus of claim 1 wherein there is additionally provided backwash means located between said product collection means and the second said metal grating.

3. The apparatus of claim 1 wherein the wire wool is twenty pounds per cubic foot by 0.0045 inch wire.

4. The apparatus of claim 1 wherein the graded gravel bed contains sequential layers of gravel sized from about one-eighth inch up to about one inch in diameter.

5. The apparatus of claim 1 wherein said knit plastic monofilament is polypropylene.

6. The apparatus of claim 1 wherein said knit plastic monofilament is oil wettable but not water wettable.

7. The apparatus of claim 1 wherein said wire wool is made from a ferrous material.

8. The apparatus of claim 1 wherein said wire wool is made from a non-ferrous material.

9. An apparatus for breaking chemical and mechanical liquid-liquid emulsions which comprises connecting together and using in sequence a plurality of the apparatus of claim 1.

10. A process for breaking chemical and mechanical liquid-liquid emulsions which comprises feeding a liquid-liquid emulsion, having at least two components, through the inlet of the apparatus of claim 1 and passing said inlet feed through said apparatus under pump pressure, and collecting the separated components and emitting same through the outlet from said apparatus.

References Cited

UNITED STATES PATENTS

| 1,728,568 | 9/1929 | Kriner | 210—284 X |
| 2,558,462 | 6/1951 | Ramsey et al. | 210—266 |
| 2,911,101 | 11/1959 | Robinson | 210—315 X |
| 3,186,551 | 6/1965 | Dornauf | 210—315 X |

SAMIH N. ZAHARNA, Primary Examiner

U.S. Cl. X.R.

210—252, 266, 284, 317